Patented Sept. 12, 1933

1,926,155

UNITED STATES PATENT OFFICE 1,926,155

IODO DERIVATIVES OF AROMATIC COMPOUNDS

Max Albert Kunz, Mannheim, Karl Koeberle and Erich Berthold, Ludwigshafen-on-the-Rhine, Germany, assignors to General Aniline Works Inc., New York, N. Y., a corporation of Delaware No Drawing. Application March 18, 1929, Serial No. 348,121, and in Germany May 29, 1928

13 Claims. (Cl. 260—61)

The present invention relates to the production of iodo derivatives of organic compounds capable of being vatted.

We have found that iodo derivatives of organic compounds capable of being vatted are obtained by treating the said compounds with iodating agents which term is meant to comprise, besides iodine, agents furnishing iodine, such as, for instance, sulphur iodide or iodine chloride, in a strong mineral oxygen acid capable of dissolving the said organic compound at least in small amounts.

As oxygen acids which may be employed according to our invention there may be mentioned, for instance, sulphuric acid, which may also be used in the form of oleum, perchloric acid, periodic acid, phosphoric acid, and the like. The said acids may be used either alone or in mixture with each other. Preferably such of the said acids are employed as are good solvents either for the initial material or the iodination products. Sulphuric acid and especially oleum may be used with particular advantage as they are good solvents. Since the said acids lose either wholly or partially their capacity of dissolving the said aromatic compounds by dilution with water, the acids are preferably employed in a highly concentrated form. The iodination may be carried out, if desired, in the presence of halogen carriers, such as, for instance, sulphur, phosphorus, antimony, iron and compounds thereof, such as the amalgams.

According to the aforedescribed process all organic compounds capable of being vatted, isocyclic as well as heterocyclic compounds, can be iodated, for example anthraquinone, anthanthrone, dianthrones, such as pyranthrone, dibenzanthrone, ms-benzdianthrone, ms-naphthodianthrone, allo-ms-naphthodianthrone, anthradianthrone and the like, or indigo, thioindigo, or such pyrazolanthrones, acridones or thioacridones as are capable of being vatted, and also isomeric and substitution products of all these compounds, for instance halogen, nitro and amino derivatives. The iodination products obtained according to our invention are either valuable dyestuffs, or intermediate products for the preparation of dyestuffs. Thus, the iodination products of anthanthrone or its derivatives are valuable vat dyestuffs, especially those containing besides iodine another halogen, preferably in such amounts that the resulting vat dyestuff contains two atomic proportions of halogen per each molecular proportion of anthanthrone; such dyestuff, for instance, monobromo- monoiodoanthanthrone, is a uniform compound. Also a dyestuff containing two halogens may be prepared, so as to contain one atomic proportion of halogen for each molecular proportion of anthanthrone; in this case, a mixture of dyestuffs results, for instance, of monobromo-anthanthrone and monoiodo-anthranthrone. Another mixture of said dyestuffs, containing, however, the three halogens iodine, bromine and chlorine simultaneously, may be prepared in such a way that it contains one molecular proportion of each of the said three halogens per each three molecular proportions of anthanthrone, the average analytical halogen content of the resulting mixture of dyestuff being accordingly two atomic proportions of halogen for each molecular proportion of anthanthrone. Particularly valuable vat dyestuffs are the mono-iodo-anthanthrones containing a further halogen atom, viz. the monoiodo-monobromo- and the monoiodo-monochloroanthanthrone dyeing cotton extraordinary fast orange to red shades.

When the organic compounds to be iodated can be prepared from intermediate products by condensation with the aid of the oxygen acids employed in the iodination process, the preparation of the initial material and the iodination may be carried out in a single operation. For example 1.1′-dinaphthyl-8.8′-dicarboxylic acid furnishes on condensation by means of concentrated sulphuric acid anthanthrone which may directly be iodated in the reaction mixture after the addition of oleum, if desired, to adjust the concentration of the sulphuric acid.

Since the process is applicable to all organic compounds capable of being vatted, a definite range of temperature at which iodination is to be carried out cannot be given. The suitable temperature largely depends on the nature of the compound to be iodated, on the intended degree of iodination and the kind and the concentration of the mineral oxygen acid employed. It is, however, to be kept in mind that some of the acids mentioned, especially sulphuric acid and oleum, react with the organic compounds either by sulphonating or oxidizing the latter. If such side reactions are to be avoided, either lower temperatures are to be employed and the treatment is to be carried on for a longer period of time, or other acids which are not so liable to react are to be used, for instance phosphoric acid. In some instances the said side reactions are even desirable, for instance, when it is intended to produce iodated sulphonic acids, or when organic compounds of the kind in question containing chlorine besides iodine are to be produced. Such latter compounds are also produced when iodating with agents supplying iodine which at the same time supply another halogen, for instance iodine chloride or iodine bromide. The quantity of iodine to be employed depends on the reactivity of the compound to be iodated and on the temperature. In most cases from one atomic to one molecular proportion of iodine is sufficient for introducing one atom of iodine. When working with an excess of iodine, the unconsumed portion thereof can be easily recovered by any suitable method, such as sublimation, or washing with sodium thiosulphate, or the like.

The following examples will further illustrate the nature of the said invention which, however, is not limited thereto. The parts are by weight.

Example 1

30.6 parts of anthanthrone obtainable by treating 1.1'-dinaphthyl-8.8'-dicarboxylic acid with sulphuric acid, are heated to 120° C. in 300 parts of sulphuric acid monohydrate. In the course of an hour 12.7 parts of iodine are then introduced while stirring and the mixture is stirred for 1 further hour at from 120° to 130° C. whereupon it is allowed to cool, poured onto ice and filtered by suction. The resulting product which is mainly monoiodoanthanthrone, is a yellowish red powder dissolving to a green solution in concentrated sulphuric acid and dyeing cotton from a violet red vat fast orange shades. If necessary, the dyestuff may be purified by recrystallizing from high boiling solvents, such as trichlorobenzene or nitrobenzene or by way of its sulphate separating from the solution in sulphuric acid by dilution with water.

Example 2

34 parts of 1.1'-dinaphthyl-8.8'-dicarboxylic acid (obtainable, for example, according to Example 1 of the British Patent No. 278,100) are dissolved in 300 parts of sulphuric acid and stirred, until no unaltered dinaphthyldicarboxylic acid can be detected any longer. Then 100 parts of 30 per cent oleum, and, after having raised the temperature to from 130° to 150° C., 12.7 parts of iodine are slowly added. The product is worked up as described in Example 1. The resulting product possesses tinctorial properties similar to those of the product described in Example 1.

Example 3

30 parts of iodine are slowly introduced at 130° C. into a solution of 30.6 parts of anthanthrone in 300 parts of sulphuric acid containing 5 per cent of sulphuric anhydride, if desired after adding 3 parts of red phosphorus. After the addition of the iodine, the reaction mixture is stirred for some time and the green solution is cooled to 30° C. At the said temperature, 70 parts of water are added so slowly that the temperature does not rise above 100° C. On cooling the oxonium sulphate of diiodoanthanthrone is separated in the form of blue red crystals. It is filtered by suction and decomposed with water. The resulting diiodoanthanthrone is a blue red crystalline powder dissolving to a green solution with a bluish tinge in concentrated sulphuric acid and dyeing cotton from a red violet vat fast clear blue red shades. It can be crystallized from nitrobenzene in long dark red needles.

Example 4

76 parts of monobromo-anthanthrone (obtainable by diazotizing monoamino-anthranthrone produced by reduction of the mononitro-anthanthrone prepared by treating anthanthrone in nitrobenzene with nitric acid of 96 per cent. strength, and by substituting the diazo group by bromine with the aid of copper bromide by the Sandmeyer reaction) are iodated in oleum, as described in Example 1. After termination of the reaction, the bromoiodo-anthanthrone formed is separated in the form of its sulphate by adding dilute sulphuric acid or ice, filtered off by suction and decomposed with water in the usual manner. It is a red powder, dissolves in concentrated sulphuric acid to a green solution, and crystallizes in red needles from nitrobenzene and dyes cotton red shades of extraordinary properties as regards fastness from a reddish violet vat.

Instead of starting from monobromo-anthanthrone, as described above, dinaphthyldicarboxylic acid may be converted into anthanthrone with concentrated sulphuric acid and the anthanthrone obtained without isolating it from the reaction mixture into its monobromo derivative by the action of the calculated amount of bromine after adding to the reaction mixture oleum containing about 23 per cent of sulphur trioxide; the monobromo-anthanthrone is then iodated in the aforesaid manner without isolating it from the reaction mixture.

When monochloroanthanthrone which is obtainable, for example, from monoamino-anthanthrone by diazotization and converting the diazonium group with cuprous chloride by the Sandmeyer process, is iodated, chloroiodoanthanthrone is obtained which is a yellow red powder dissolving to a green solution in concentrated sulphuric acid and dyeing cotton from a red violet vat fast clear orange red shades.

Example 5

38 parts of chlorobromoanthanthrone obtainable by chlorination and subsequent bromination of anthanthrone in sulphuric acid monohydrate, are iodated in 400 parts sulphuric acid monohydrate by means of 15 parts of iodine at 130° C. as described in Example 1. After working up in the usual manner, a yellow red powder is obtained which contains one molecular proportion of each of the said three halogens for each three molecular proportions of anthanthrone, the average analytical halogen content of the dyestuff being accordingly two atomic proportions of halogen for each molecular proportion of anthanthrone. It dissolves to a green solution in concentrated sulphuric acid and dyes cotton from a red violet vat orange red shades of excellent fastness. From solvents of high boiling point, such as nitrobenzene, it crystallizes in the form of red needles.

Example 6

30.6 parts of anthranthrone are dissolved in 300 parts of sulphuric acid monohydrate, and 25 parts of bromoiodide are added at 130° C. while stirring. The product is worked up as described in Example 1. The resulting product contains bromine and iodine and is an orange red powder having tinctorial properties similar to those of the bromoiodoanthanthrone described in Example 4.

Example 7

30.6 parts of anthanthrone are heated to 150° C. in a mixture of 150 parts of sulphuric acid monohydrate with 150 parts of anhydrous phosphoric acid. At the said temperature 25 parts of iodine are then slowly added. The reaction mixture is stirred from one to two further hours, allowed to cool and poured onto ice. The resulting orange colored iodoanthanthrone is filtered by suction. It dissolves to a green solution in concentrated sulphuric acid and dyes cotton from a violet red vat orange shades.

When working with phosphoric acid alone, the temperature must be maintained at 200° C.

Example 8

40.6 parts of pyranthrone are dissolved in 400 parts of sulphuric acid monohydrate, and 12.7 parts of iodine are added at 130° C. while stirring. The mass is maintained at the said temperature until a sample, when vatted, dyes cotton strong reddish yellow shades. The product is worked up in the usual manner. The resulting iodopyranthrone is a yellowish red powder dissolving to a blue solution in concentrated sulphuric acid and dyeing cotton from a red violet vat strong clear reddish orange shades.

When starting from dibromopyranthrone which is obtainable by brominating pyranthrone in chlorosulphonic acid in the presence of sulphur, iodobromopyranthrone is obtained in an analogous manner which dyes cotton from a red violet vat more reddish shades than the above iodopyranthrone.

Example 9

33.2 parts of 3.4.8.9-dibenzopyrene-5.10-quinone are dissolved in 300 parts of sulphuric acid with an addition of 50 parts of oleum containing 23 per cent of $SO_3$ and 1.6 parts of iron sulphate. The solution is heated to 120° C. and 12.7 parts of iodine are added while stirring. For completing the formation of the dyestuff the mixture is stirred for one further hour at from 110° to 120° C. and then worked up as usual. The resulting iododibenzopyrenequinone is a yellow powder dissolving in concentrated sulphuric acid with reddish blue coloration and dyeing cotton from a violet red vat bright orange yellow shades.

When starting from monobromodibenzopyrenequinone obtainable by brominating dibenzopyrenequinone in chlorosulphonic acid, iodobromodibenzopyrenequinone is obtained in an analogous manner which dyes cotton from a violet vat fast clear orange shades.

Example 10

30.2 parts of 3.4.8.9-dibenzopyrene-5.10-quinone are treated with 30 parts of iodine as described in Example 8. The resulting solution is cooled to 30° C. and 100 parts of water are slowly added. On cooling, the crystalline oxonium sulphate of diiodo-dibenzopyrene-quinone is separated which is filtered off by suction and decomposed with water. Diiodo-dibenzopyrenequinone is obtained which is a reddish yellow powder dyeing cotton from a violet vat clear reddish orange shades of excellent fastness. It crystallizes from nitrobenzene in long yellowish red needles.

Example 11

8.3 parts of 3.4.8.9-dibenzopyrene-5.10-quinone are heated for some hours from 140° to 150° C. in 100 parts of sulphuric acid monohydrate with 5 parts of chloroiodide while stirring. After cooling, the product is worked up as usual. The resulting chloroiodo-3.4.8.9-dibenzopyrene-5.10-quinone is an orange powder; it crystallizes in orange red needles, dissolves to a violet solution in concentrated sulphuric acid and dyes the vegetable fibre from a bluish red vat clear orange yellow shades of excellent fastness.

Example 12

26 parts of iodine are introduced at 90° C. into a solution of 45 parts of dibenzanthrone in 450 parts of sulphuric acid monohydrate, while stirring, and the mass is kept for some time at the said temperature. The product is worked up in the usual manner. The resulting iodo-dibenzanthrone dissolves to a violet solution in concentrated sulphuric acid and dyes cotton from a violet red vat fast blue violet shades.

When dibromodibenzanthrone obtainable by brominating dibenzanthrone in chlorosulphonic acid in the presence of antimony, is iodated in the same manner, iodobromodibenzanthrone is obtained which dyes cotton from a violet blue vat fast navy blue shades and dissolves in concentrated sulphuric acid with a violet coloration.

Example 13

45 parts of isodibenzanthrone are dissolved at 80° C. in 450 parts of sulphuric acid monohydrate and treated with 26 parts of iodine as described in Example 11. After working up in the usual manner, iodo-isodibenzanthrone is obtained as a reddish blue powder dissolving to a green solution in concentrated sulphuric acid and dyeing cotton from a blue violet vat bright violet shades.

Example 14

7.1 parts of monobromo-4.5.8.9-dibenzopyrene-3.10-quinone are heated to from 120° to 130° C. in 100 parts of sulphuric acid monohydrate with 2.5 parts of iodine while stirring. When all iodine has been taken up, the mass is allowed to cool and worked up in the usual manner. The resulting bromoiodo-4.5.8.9-dibenzopyrene-3.10-quinone is a bluish red powder dissolving in concentrated sulphuric acid to give an orange brown solution and dyeing cotton from an orange vat blue red shades of excellent fastness.

In a similar manner a chloroiodo derivative dyeing cotton red shades is obtained from monochloro-4.5.8.9-dibenzopyrene-3.10-quinone.

Example 15

20.8 parts of anthraquinone are heated to 150° C. in 200 parts of sulphuric acid monohydrate while stirring. 15 parts of iodine are added in the course of an hour and the mass is kept at the said temperature for about one further hour. The product is worked up as usual after cooling. The resulting iodoanthraquinone is a yellowish powder dissolving in concentrated sulphuric acid to a reddish yellow solution and can be recrystallized from ethyl alcohol or glacial acetic acid.

In a similar manner the homologues of anthraquinone such as methylanthraquinones or derivatives, such as halogen or aminoanthraquinones can be converted into iodo derivatives.

Example 16

90 parts of 1.2.5.6-diphthaloylacridone obtainable by condensing 1-chloroanthraquinone-2-carboxylic acid with 2-aminoanthraquinone, are dissolved in 900 parts of sulphuric acid monohydrate and 50 parts of iodine are slowly added at 150° C. while stirring. The product is worked up in the usual manner. The resulting iodo-1.2.5.6-diphthaloylacridone is an orange red powder dissolving to a yellowish red solution in concentrated sulphuric acid and dyeing cotton from a blue violet vat red orange shades fast to light.

Example 17

44 parts of N-dihydro-1.2.1'.2'-anthraquinone-azine are dissolved in 500 parts of sulphuric acid monohydrate, heated to 150° C. and 30 parts of iodine are slowly added. The mass is further heated until a sample dyes cotton from a blue hydrosulphite vat green blue shades. The mass is allowed to cool, poured onto ice, and the product which is obtained in the form of bluish green flakes, is filtered by suction. A bluish green powder is obtained dissolving to a yellowish brown solution in concentrated sulphuric acid and dyeing cotton from a blue vat greenish blue shades.

Example 18

44.5 parts of benzanthronepyrazolanthrone obtainable by alkaline condensation from N-benzanthronyl-pyrazolanthrone, are heated to 100° C. in 450 parts of sulphuric acid monohydrate while stirring. 30 parts of iodine are slowly added, stirring is continued for some time at the said temperature and the product is worked up in the usual manner. The resulting iodobenzanthrone-pyrazolanthrone is a blue powder dyeing cotton from a blue vat navy blue shades and dissolving in concentrated sulphuric acid with a violet coloration.

Example 19

40 parts of ms-anthradianthrone are dissolved in 400 parts of 5 per cent oleum. After adding 15 parts of iodine, the mass is heated to from 125° to 140° C. while stirring, kept at the said temperature until the bulk of the iodine has been taken up, allowed to cool, poured into water and filtered by suction. The resulting product which according to analysis is iodo-ms-anthradianthrone, is an orange powder dissolving in concentrated sulphuric acid with a violet blue coloration and dyeing cotton from a blue violet vat yellow orange shades of excellent fastness.

Example 20

20 parts of allo-ms-naphthodianthrone are dissolved while stirring in 250 parts of sulphuric acid monohydrate. After adding 13 parts of iodine the temperature is raised to from 140° to 150° C. and maintained thereat until all iodine has been taken up. The mass is allowed to cool and worked up in the usual manner. The resulting dyestuff containing about 30 per cent of iodine is an orange powder dissolving to a blue solution in concentrated sulphuric acid and dyeing cotton from a violet vat orange shades of excellent fastness.

Example 21

200 parts of allo-ms-naphthodianthrone are dissolved in 2000 parts of sulphuric acid monohydrate and 150 parts of bromo iodide are added. The mass is slowly heated to 150° C. while stirring, kept at that temperature for some hours, allowed to cool and worked up as usual. The resulting dyestuff containing bromine and iodine is an orange powder dissolving to a blue solution in concentrated sulphuric acid and dyeing cotton from a blue vat orange shades of excellent fastness.

Example 22

4 parts of 4.4'-dimethyl-6.6'-dichlorothioindigo are heated to 120° C. with 100 parts of sulphuric acid monohydrate and 3 parts of iodine chloride while stirring and kept at the said temperature for a short time. After cooling, the product is worked up in the usual manner. The resulting dyestuff containing in addition to 2½ atomic proportions of chlorine, 1½ atomic proportions of iodine for each molecular proportion of 4.4'-dimethylthioindigo, is a blue red paste, and a blue red powder when dried, dissolves only difficultly in concentrated sulphuric acid with a green coloration and dyes cotton from a greenish yellow vat red violet shades of excellent fastness.

Example 23

40 parts of 4.4'-dimethyl-6.6'dichlorothioindigo are heated to 110° C. in 800 parts of sulphuric acid monohydrate with 26 parts of iodine while stirring. The mass is kept for a short time at that temperature and worked up in the usual manner after cooling. The resulting iodo-4.4'-dimethyl-6.6'-dichlorothioindigo has properties similar to those of the dyestuff described in Example 22.

Example 24

25.2 parts of perylene are dissolved in 250 parts of sulphuric acid monohydrate. After adding 50 parts of ferrous sulphate and 25 parts of iodine the mass is heated while stirring to 150° C. and kept at that temperature for some hours, whereupon it is allowed to cool and worked up in the usual manner. The resulting dyestuff which appears to be an iodated perylenequinone is a grey powder dissolving only difficultly to a blue solution in concentrated sulphuric acid and dyeing cotton from a violet vat grey shades.

In an analogous manner a perylenequinone containing iodine is obtained from perylenequinone by means of iodine in sulphuric acid monohydrate or oleum.

What we claim is:—

1. A process of iodating organic compounds capable of being vatted which comprises acting on a compound of the said kind with an iodating agent in a strong polybasic mineral oxygen acid capable of dissolving the said compound.

2. A process of iodating organic compounds capable of being vatted which comprises acting on a compound of the said kind with an iodating agent in a strong polybasic mineral oxygen acid capable of dissolving the said compound, in the presence of a halogen carrier.

3. A process of iodating organic compounds capable of being vatted which comprises acting on a compound of the said kind with an iodating agent in sulphuric acid.

4. A process of iodating organic compounds capable of being vatted which comprises acting on a compound of the said kind with an iodating agent in oleum.

5. A process of iodating anthanthrones which comprises acting on an anthanthrone with an iodating agent in a strong mineral polybasic oxygen acid capable of dissolving the said anthanthrone.

6. A process of iodating anthanthrones which comprises acting on an anthanthrone with an iodating agent in oleum.

7. A process of iodating anthanthrone containing halogen which comprises acting on the said anthanthrone with an iodating agent in a strong polybasic mineral oxygen acid capable of dissolving the said anthanthrone.

8. A process of iodating monobromoanthanthrone, which comprises acting on the said anthanthrone with an iodating agent in a strong polybasic mineral oxygen acid capable of dissolving the said anthanthrone.

9. Iodated anthanthrones.

10. Iodated anthanthrones containing a further halogen.

11. Vat dyestuffs dyeing cotton from orange to red shades from violet red vats and dissolving to green solutions in concentrated sulphuric acid, said dyestuffs being halogen anthanthrones and having an average halogen content of two atomic proportions of at least two halogens of which one is iodine, per each molecular proportion of anthanthrone.

12. Vat dyestuffs dyeing cotton from orange to red shades from violet red vats and dissolving to green solutions in concentrated sulphuric acid, said dyestuffs being halogen anthanthrones and having an average halogen content of two atomic proportions of iodine and bromine per each molecular proportion of anthanthrone.

13. Practically uniform monoiodo-mono-bromo-anthanthrone, forming a red powder, dissolving to a green solution in concentrated sulphuric acid and dyeing cotton from a reddish violet vat extraordinary fast red shades.

MAX ALBERT KUNZ.
KARL KOEBERLE.
ERICH BERTHOLD.